United States Patent [19]
Moffett

[11] Patent Number: 5,158,122
[45] Date of Patent: Oct. 27, 1992

[54] DUAL PNEUMATIC TIRE INFLATOR

[75] Inventor: Joseph G. Moffett, McHenry, Ill.

[73] Assignee: Patrick Moffett, Long Beach, Calif.

[21] Appl. No.: 634,018

[22] Filed: Dec. 26, 1990

[51] Int. Cl.$^5$ .......................... B60C 29/12; B65B 3/26
[52] U.S. Cl. ..................... 141/38; 73/146.8; 152/415; 137/227; 137/231; 141/83; 141/242; 141/383
[58] Field of Search ............... 141/38, 83, 94, 95, 141/237, 242, 247, 383; 137/223, 224, 227, 228, 231; 152/415; 73/146, 146.2, 146.3, 146.8

[56] References Cited

U.S. PATENT DOCUMENTS

| | | | |
|---|---|---|---|
| 3,208,425 | 9/1965 | Jousma et al. | 73/146.8 |
| 3,479,868 | 11/1969 | Boyer | 73/146.8 |
| 4,421,151 | 12/1983 | Stumpe | 141/38 X |
| 4,658,869 | 4/1987 | Soon-Fu | 141/98 |

FOREIGN PATENT DOCUMENTS

| | | | |
|---|---|---|---|
| 229004 | 11/1959 | Australia | 141/38 |
| 1450782 | 8/1966 | France | 141/38 |
| 399930 | 4/1966 | Switzerland | 141/38 |

Primary Examiner—Ernest G. Cusick
Attorney, Agent, or Firm—Breneman & Georges

[57] ABSTRACT

A dual pneumatic tire inflator is provided for simultaneously adding and equalizing the air pressure in dual tires commonly employed in tractor trailer trucks, airplanes, tractors and other dual wheeled vehicles. The dual pneumatic tire inflator includes a housing having an inlet valve for receiving pressurized air from a common air pressure source and a pair of pressure hoses connected to a pair of locking valve tire chucks for engaging each valve of the dual tire assembly and a pressure gauge for indicating the common pressure of the dual tires and a relief valve for adjusting and equalizing the air pressure in the dual tires. The housing is preferably of an elongated body having an inlet disposed at one end, a pressure gauge disposed at the other and the two pressure hoses and pressure relief valve disposed in a planar relationship.

20 Claims, 3 Drawing Sheets

DUAL PNEUMATIC TIRE INFLATOR

BACKGROUND OF THE INVENTION

1. Field of the Invention

The invention pertains to a dual pneumatic tire inflator for simultaneously inflating two dual tires and thereafter equalizing the pressure in each of the dual tires through an equalizer valve to provide a quick and easy means for making certain dual tires are properly inflated and the dual tires are at the same pressure prior to returning the tires to service. More particularly the invention pertains to a dual tire inflator having a housing including an air pressure inlet, a gauge, a pair of dual tire inflation hoses having locking chuck valves for engaging and locking on each of the valve stems of the inside and outside dual tires and a pressure relief valve for equalizing the pressure between the pneumatic dual tires.

The novel dual tire inflator is designed for the attachment of the locking chuck valves to each of the tire or tube valve stems of the inside and outside dual tires to allow the equalization of pressure between the inside and outside of dual tires prior to the attachment of the air pressure source to the inlet flow valve which in combination with the gauge allows the equalization and provides a pressure reading for both of the dual tires of the dual tire arrangement. In this manner the integrity of each tire can be assessed as well as determining whether a leak or faulty valve condition exists in either or both of the dual tires prior to the attachment of the air pressure source to the housing.

The attachment of the pressure source to the inlet flow valve allows both of the dual tires to be simultaneously inflated to the same pressure so that subsequent removal of the air pressure source from the air inlet flow valve in the housing allows both of the tires to be simultaneously deflated to a predetermined and desired inflation through the utilization of the common bleed valve. In this manner both of the inside and outside dual tires for vehicles such as trucks, airplanes, tractors and trailers may be equalized to the proper inflation level thereby increasing the service life, efficiency and dependability of dual tire applications.

2. Description of the Prior Art

The importance of properly inflating and maintaining the pressure of tires has been recognized in the prior art in relation to the efficiency of the dual tire arrangement and the service life provided by each of the dual tires. As a result a number of different devices have been provided to carefully regulate and calibrate the amount of air admitted to pneumatic tires such as is represented by McAnally, et al U.S. Pat. No. 4,872,492. Such prior art devices have carefully controlled the amount of pressure provided to individual pneumatic tires but present difficulty in providing precise equalization of tires in dual tire applications due to the inaccessibility and difficulty in securing the pneumatic tire inflator to the inside dual of the dual tire arrangement.

In dual tire applications the prior art has provided a number of valve extension devices for attachment to the inside dual tire valve to make the inside dual tire more accessible to the tire pressure source. Such valve extension devices as are available from Schrader as Easy-Reach and Air Masters as Dual-Tire Inflators merely extend the length of the inside dual tire valve assembly to an accessible location on the outside dual. Such extension devices significantly increase the ease of equalizing the pressure between the inside dual and the outside dual tires by making the valve stems more accessible but they do not provide a means for simultaneously filling and equalizing the pressure in both the dual tires.

The most pertinent patented prior art appears to be Da Silva U.S. Pat. No. 4,875,509 which provides a device suitable for simultaneously filling and equalizing the pressure in both dual tires. In Da Silva U.S. Pat. No. 4,875,509 an air pump pressure control system is provided in which pressure may be simultaneously added to both dual tires through a pair of conduits connected through a valve means to a common pressure source to inflate both dual tires and to evacuate air from the tires in a deflating mode to equalize the tire pressure in the dual tires which is displayed in separate visual gauges. This device while assisting in the equalization of pressure in dual tires suffers the great disadvantage of not being portable. Therefore if the service center is not equipped with this device the operator must again individually inflate each of the tires and utilize a pressure gauge to approximate the pressure between the two dual tires. As a result such non transportable devices are not only an expensive means for equalizing pressure in dual tires but are only fortuitously available so that operators of vehicles having dual tires must generally rely upon the commonly available single tire pressure inflators to inflate both tires of the dual tire arrangement.

The most relevant portable device uncovered in the course of reviewing available products on the market was the Quick Way Tire Inflation System manufactured by Quick Way Inc. of Las Vegas, Nev. The Quick Way Tire Inflation System is an apparent outgrowth of the extension valve prior art of Schrader and Air Masters as previously discussed. In the Quick Way Tire Inflation System a pair of hoses are provided having fittings for connection to valve extension hoses for both the inside and outside valve stems of the dual tire arrangement. The Quick Way Tire Inflation System extension hoses for the inside and outside dual tire valve fittings are permanently mounted to a support at the hub to provide a quick connect to a housing having one quick fitting, a hose connected to another quick connect fitting, an inflow valve and a pressure gauge. The housing quick connect fitting is designed to connect to one of the valve extension hoses and the other quick connect fitting on the hose is designed to connect to the other valve extension hose. The inflow valve is designed for connection to a single air pressure source to simultaneously inflate both dual tires to the same pressure in both the dual tires.

The Quick Way Tire Inflation System does not include a bleed valve to deflate both tires to a simultaneous equal pressure and does not include a pair of hoses with tire valve locking chucks for engaging each of the tire or tube valve stems. Since the valve extenders remain permanently affixed to the inside and outside dual tires to keep the tire valve stems constantly open there remains a possibility for leakage at the open valve stem connection on the extender.

The Quick Way Tire Inflation System further does not include a bleed valve for equalizing the pressures between the dual tires and therefore does not equalize the pressures between the two tires to a predetermined level by providing an inflating mode to inflate the tires and to simultaneously and equally remove air from both the tires in a deflating mode. The Quick Way Tire Inflation System further requires the mounting of the valve extenders to both the inside dual tires and outside dual tires which can interfere with the operation and standard interchangeability of the tires from front wheel and rear wheel rotation and dual arrangement which generally requires the removal of the extenders from the inside and the outside dual tires.

The dual tire inflator of the invention in contrast provides a system which does not interfere with tire operation, rotation or the inside or outside dual arrangement and which does not require the addition of separate extenders or result in the system becoming useless when one of the extenders having a special fitting is lost or becomes damaged. In addition the dual pneumatic tire inflator of the invention allows the standard and commonly employed dual tire configuration in heavy trucks, aircraft and other installations to be employed without the addition or maintenance of valve extension apparatus which can become entangled in the dual tire gear or retraction mechanisms and thereby result in dangerous conditions as for example when the extenders become entangled in retractable wheel systems such as are utilized in commercial aircraft.

The novel dual tire pressure inflator of the invention is fully compatible with the standard dual tire arrangements without modification by employing a detachable valve chuck for locking onto the tire or tube valve stem when in use and providing for its removal when not in use from the valve stem to leave the tire in its unencumbered configuration after the equalization of pressure in the dual tires. The dual tire pressure inflator of the invention further allows the equalization of pressure in inflation and deflation to assure the more uniform equalization of pressure in dual tire arrangements.

SUMMARY OF THE INVENTION

The disadvantages and limitation of prior art systems and devices for adding, equalizing and maintaining equal tire pressure in dual tires at a predetermined value are obviated while providing additional advantages in preserving and prolonging the operational life of dual tires. More particularly the disadvantages and limitations of the extension valve art systems in which extension hoses are employed in order to extend and relocate the tire or tube valve to a convenient location on the outside dual rim and the problems of cracking, loosening and subsequent pressure loss as a result of leaks in the extenders or the loss of the extenders are obviated by the dual tire inflator of the invention.

The dual tire inflator of the invention achieves its advantages by utilizing a pair of locking tire valve chucks for connection to the inside and outside valve stems of the dual tires which are connected to conduits connected to the inflator housing having a pressure gauge, a tank valve and a bleed air valve. The dual tire pressure inflator of the invention in operation is connected to the inside and outside dual tires by connecting the locking tire valve chucks to the valve stems of the tire or tubes of the inside and outside dual tires to allow the equalization of pressure between the two tires before connecting the tank valve in the housing to a single pressure source to equalize the pressure in the inside and outside dual tires before adding air pressure equally to the inside and outside dual tires.

The air pressure source may then be removed from the tank valve and the pressure reduced simultaneously in both tires to a predetermined value utilizing the bleed valve and pressure gauge. Once the tires are inflated to the desired equal pressure the locking tire chuck valves are removed from the inside and outside dual tires. The dual tires thereafter are returned to service so that the valve stems of the tire or tube of the inside and outside dual tires do not remain open. The present invention thereby obviates the requirement for extension hoses and eliminates the possibility of failure of a tire because of a failure of the extension hose to remain in position on the tires as a result of becoming dislodged or other extension failures such as fatigue, breaking or cracking which could result in the operating of the dual tires at different pressures and leading to tire loss.

The dual tire inflator of the invention provides numerous advantages over the prior art in allowing the removal of both hoses from the tire valve stem to prevent the dislodging, entanglement or loss of the extenders of the prior art such as the possible dangerous condition of an unconstrained hose becoming lodged in parts such as in aircraft wheel retraction mechanisms thereby resulting in the potential for the gear to become stuck in a locked up, locked down or in transit position and for the potential for the hose to crack or sever and thereby allow all of the air in the tire to be lost.

The dual tire inflator of the invention further combines the benefits of not interfering with the traditional dual tire arrangement while allowing both tires to be inflated at a predetermined pressure or deflated down to a desired pressure to increase the service life of the tire and to provide advantages in the dual tire efficiently and equally bearing loads in the manner contemplated by the dual tire configuration. The invention provides an inexpensive and easily stored device that can be connected and disconnected to a common pressure source to simultaneously inflate or deflate dual tires to a predetermined pressure. As a consequence of its design and construction the novel dual tire inflator can be conveniently and inexpensively fabricated and easily stored during periods of non-use in the tool compartment of truck drivers or ground and maintenance personnel responsible for inflating tires of aircraft and other vehicles having dual tire installations.

DESCRIPTION OF THE DRAWINGS

Other advantages of the invention will become apparent from the following detailed description of the invention in conjunction with the accompanying drawings in which.

DETAILED DESCRIPTION OF THE INVENTION

Figure 1:
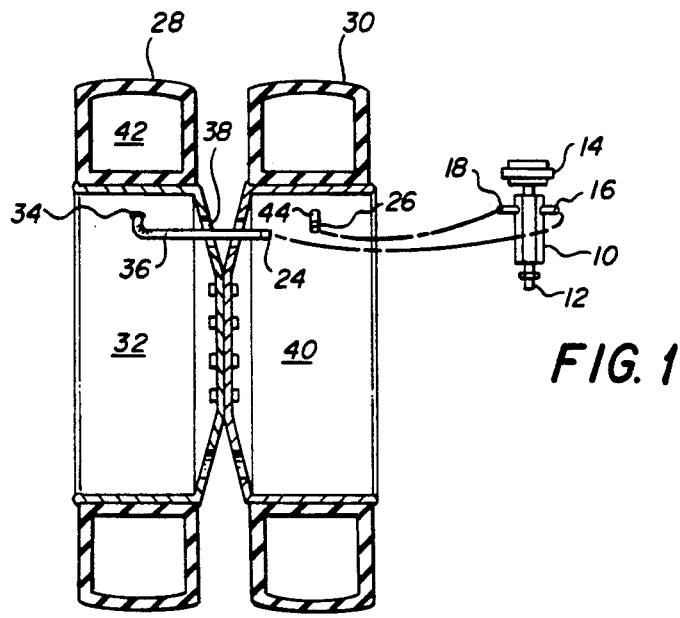
FIG. 1 is a diagrammatic view illustrating a dual tire arrangement partly in section and schematically illustrating the connection between the dual tire valve stems and the housing of the dual tire inflator of the invention.
Figure 2A:
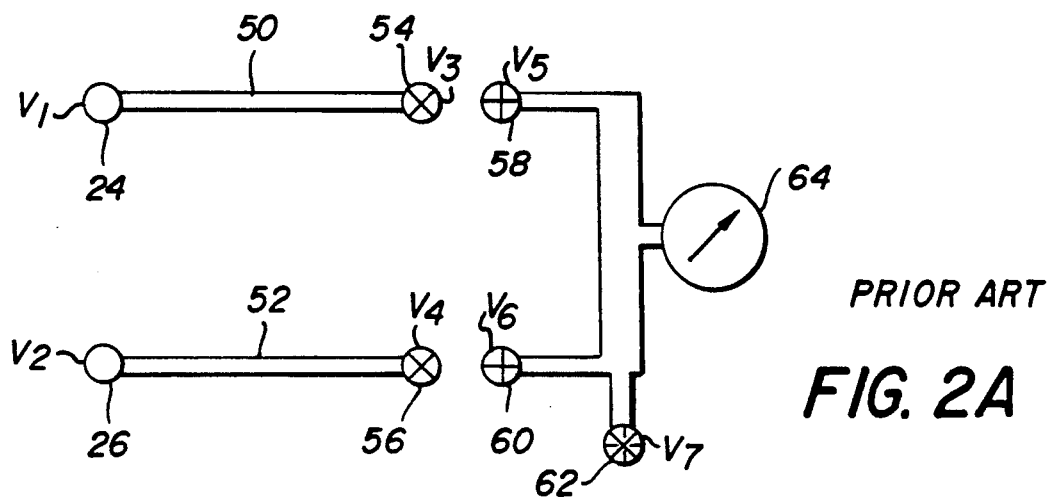
FIG. 2A is a schematic diagram of the arrangement of valves, extension hoses and gauge of an available prior art device.

Referring now to FIGS. 1, 2A, 2B and 3 a dual tire inflator of the invention is illustrated and compared with a prior art tire inflator schematically illustrated in FIG. 2A. The dual tire inflator of the invention includes an inflator housing 10 having an inflow tank valve 12, a pressure gauge 14 or 145 and a pair of hose assemblies 16 and 18 terminating in a pair of locking tire chuck valves 20 and 22 for locking onto valves 24 and 26 of an inside dual tire 28 and an outside dual tire 30.

In typical dual tire arrangements as illustrated in FIG. 1 the pneumatically inflated inside dual tire 28 is mounted on rim 32 which includes an opening 34 for an extended valve stem 36 which is made of metal. Extended valve stem 36, in some cases for tires intended as inside dual tires, is bent and may partially extend to or through a rim opening 38 of rim 32 to provide access from the outside dual rim 40. The extended valve stem 36 is not the same as extenders previously discussed since it is integral with either the tire or a tube inside the dual tire 28 and is composed of metal and cannot be removed without damaging the tire. In either case the purpose of the extended valve stem 36 or valve stem 44 is to provide access to the interior 42 of the tire as a unitary structure with the interior 42 of the tire to provide a composite structure for determining the integrity of the air compartment inside the tire. In addition a valve 24 is disposed at the end of the extended tube valve stem 36 in much the same manner as the valve 26 is disposed in the end of a typical valve stem 44 as is illustrated on outside dual tire rim 40.

In dual applications it is generally desirable to have an extended valve stem disposed on the inside dual tire for ease of adjusting the air pressure to the tire since as is known to those accustomed to adding pressure to inside dual tires it is difficult to locate and reach through the rim openings 38 in the rims 40 and 32 in order to add air to the inside dual tire without an extended valve stem 36 disposed on the inside dual tire 28. In addition the inflation of an extended valve stem 36 or a typical valve stem 44 through a single pressure source is a somewhat difficult task especially where a uniform inside and outside tire pressure is desired in order to properly inflate the inside and outside dual tires of a dual tire arrangement.

Figure 2B:
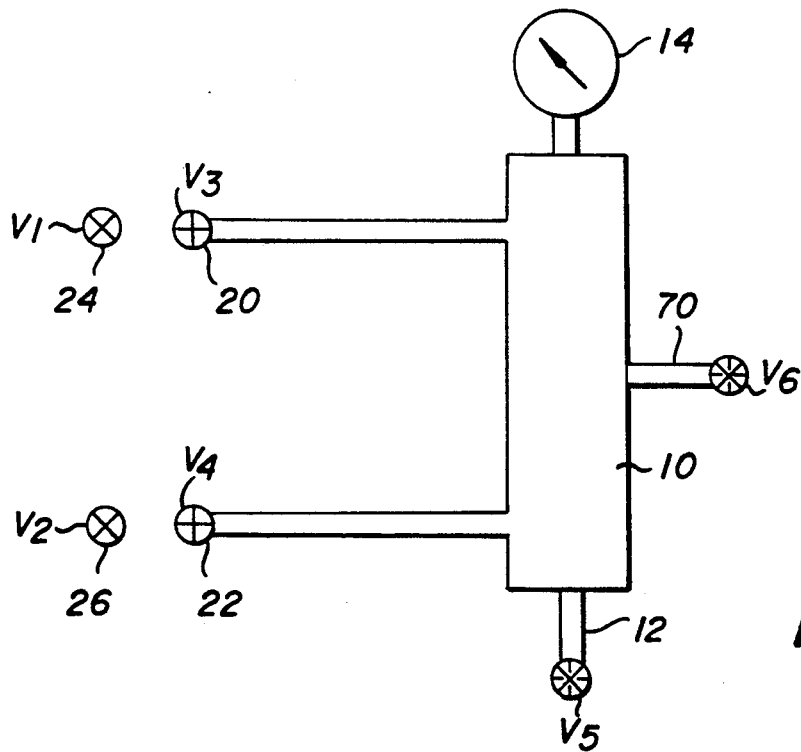
FIG. 2B is a schematic diagram of the arrangement of valves, gauge and bleed valve of the dual tire inflator of the invention.

The most pertinent prior art uncovered in the course of the search of devices available on the market was the Quick Way Tire Inflation System which is schematically illustrated in FIG. 2A which is compared to a similar schematic system of the invention as illustrated in FIG. 2B. In the Quick Way Tire Inflator System valve 24 and 26 as represented by V1 and V2 are opened and remain open by the attachment of the extension hoses 50 and 52 which terminate in valves 54 and 56 as represented by V3 and V4 in FIG. 2A. These valve extensions for both the inside dual tire and outside dual tire 28 and 30 are made of rubber and are fixed to the hubs of the wheel. As such the rubber extension hoses 50 and 52 are carried with the wheel assembly and are subject to considerable wear and tear in the operative environment and are subject to cracking and becoming dislodged due to the centrifugal and shock forces the wheels encounter in their operation. As a result open valves 24 and 26 present the ever present possibility of air pressure being lost in the extension hoses 50 and 52 due to the cracks that can develop in the hoses since valves 24 and 26 remain open to valves 54 and 56.

The problem of open valves 24 and 26 along with extension hoses 50 and 52 are compounded where dual tires are utilized in aircraft since the possibility also exists for such extension hoses to become loose and entangled in the retractable landing gear system of an aircraft which could result in dangerous conditions such as the failure of the gear to properly deploy. This problem of jamming between parts is further compounded by the potential for a complete loss of air pressure in the dual tires if extension hoses 50 and 52 are severed or become dislodged before or during a landing.

The Quick Way Tire Inflator System of the prior art in addition as illustrated in FIG. 2A includes two Quick Ring Valves V5 and V6 at 58 and 60 for opening valves V3 and V4 for adding air to open valves 24 and 26 by the attachment of a single pressure source to valve 62 at V7 which provides an indication of the tire pressure through gauge 64. The prior art system does not include a bleed valve for allowing both the dual tires to be deflated to a uniform pressure. In addition it appears the prior art system can only inflate the tires to a constant pressure and therefore unlike the present invention is incapable of providing a means for determining if both tires are capable of maintaining a constant pressure.

The dual tire inflator of the present invention in contrast with the prior art does not employ extension hoses mounted to the tire rim which maintain the tire or tube valve stem in a constant open position and as such obviates the problem of such extension hoses becoming cracked, dislodged or otherwise becoming entangled in the components of retractable landing gear systems or other systems in which such hoses are undesirable additions to the dual tire and which can create dangerous conditions by allowing the valves 24 and 26 to remain open in the operation of the dual tire assembly. In FIG. 2B the valves 24 and 26 remain closed until they are accessed by the locking tire chuck valves 20 and 22 as represented schematically by V3 and V4. Once the locking tire chuck valves are attached to the valves on the inside and outside dual tires, the valves V1 and V2 are opened to the tire inflator housing 10 which results in an indication in pressure qauge 14 and the equalized pressure in each of the dual tires 28 and 30.

In operation it is possible to individually ascertain the pressure in the inside dual tire 28 by connecting the locking tire chuck valve 20 only to the valve 24 of the inside dual tire 28 and reading the pressure in pressure gauge 14. This process can be repeated for the outside dual tire by attaching locking tire chuck valve 20 to valve 26 to directly read the pressure in outside dual tire 30. However, once both locking tire chuck valves 20 and 22 are attached to valve 24 and 26 the pressure read by pressure gauge 14 is the equalized pressure in both of the tires which can be equalized prior to the addition of pressurized air from a single air pressure source (not shown) through tank valve 12. Air pressure to the two tires may thereafter be equally added to a predetermined pressure and then equalized at a lower pressure through the utilization of the relief valve 70 (FIG. 4) to deflate the tires to a uniform, predetermined and desired value.

Once the desired air pressure value for both the inside and outside dual tires are achieved through the dual tire pressure inflator the locking tire chuck valves 20 and 22 are removed which results in the closing of valves 24 and 26 which may thereafter be capped to return the tires to service in the same configuration contemplated by the manufacture of the dual tire without extension valves and other devices remaining on the tires that can become broken, cracked, dislodged or otherwise interfere with the operation of the dual tire assembly. The dual tire inflator of the invention unlike the prior art allows for the equalization of pressure in the dual tires by the utilization of relief valve 70 to uniformly equalize the pressure in both the inside dual tire 28 and outside dual tire 30 to a predetermined value which cannot be utilized by prior art devices.

Figure 3:
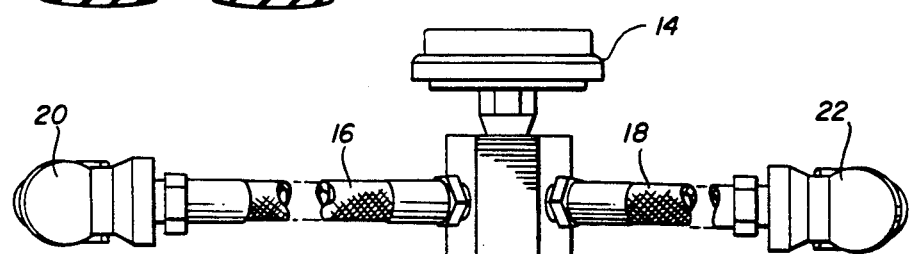
FIG. 3 is an elevational view partly in section of a dual tire inflator of the invention.
Figure 4:
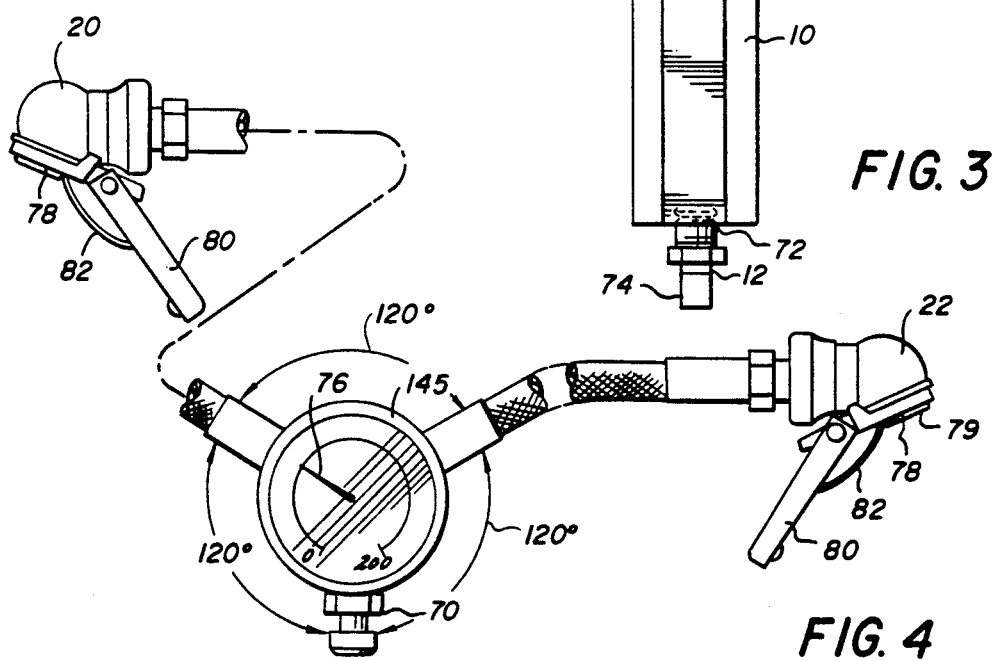
FIG. 4 is a top plan view partially in section of the dual tire inflator of FIG. 3.

Referring now to FIGS. 3 and 4 the novel dual tire inflator in its preferred embodiment and best mode is illustrated in which the inflator housing 10 is of an elongated configuration having at one end an opening 72 for receiving a tank valve 12 which may optionally include threads for attachment. Tank valve 12 may include an optional cap 74 for protecting the tank valve 12 from dust and dirt when the dual tire inflator is not in use. Tank valve 12 is designed to receive a standard single high pressure air source. In high pressure applications the high pressure air source is threadably engaged to the tank valve 12 to simultaneously inflate the dual tires 28 and 30 through locking tire chuck valves 20 and 22. The indicator 76 in pressure gauge 14 provides an indication of tire pressure or equalized tire pressure and adjusted tire pressure when the single pressure source is connected to tank valve 12 as well as when relief valve 70 is utilized to equalize the tire pressure in tire 28 and 30. Pressure gauge 145 is designed for heavy duty dual tire applications and includes pressure readings from 0 to 200 PSI as indicated in FIG. 4. The hose assemblies 16 and 18 are also designed to withstand high pressures and may be formed from hoses such as is available from AMFLOW No. 504. The locking tire chuck valves 20 and 22 are also designed for high pressure applications and may also be obtained from AMFLOW as No. 104CA ¼ NpT or equivalent.

The locking tire chuck valves 20 and 22 include a locking lever arm arrangement having an inside clip 78 projecting inside opening 79 which is activated by a lever arm 80 which is tensioned by a tension spring 82. The locking tire chuck valves 20 and 22 are designed to lockably engage valves 24 and 26 so that air can be uniformly added from a common air pressure source through tank valve 12 to uniformly inflate inside dual tire 28 and outside dual tire 30. Air pressure from inside dual tire 28 and outside dual tire 30 is uniformly released through relief valve 70 which may be obtained from Allen Air Company under the designation BV-⅛ or equivalent to simultaneously reduce the air pressure equally from both tires 28 and 30 to a predetermined level utilizing the pressure gauge 14.

Pressure gauge 14 may similarly be obtained from AMFLOW under Part No. 1101-160 ⅛ NPT BACK CONN. or equivalent. The tank valve may also be obtained from AMFLOW under Part No. 701 ⅛ NPT or equivalent. The housing assembly is preferably made from brass stock and is designed to withstand high pressures and may include threadable openings for the hose assemblies 16 and 18 and pressure gauge 14 and the pressure relief valve 70 which may be obtained from Allen Air Company under the model designation BV-⅛ or its equivalent.

Figure 5:
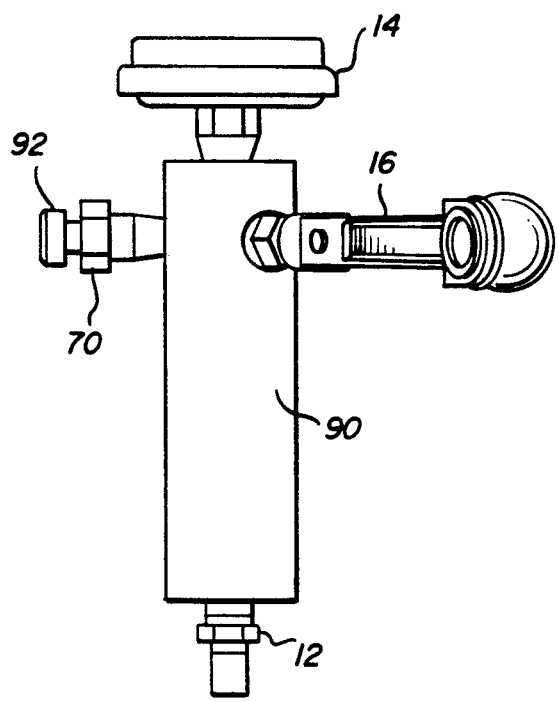
FIG. 5 is an alternative embodiment of the dual tire inflator of the invention employing a cylindrical inflator housing.

Referring now to FIG. 5 an alternative embodiment of the invention is illustrated in which the pressure gauge 14, relief valve 70 and hose assemblies 16 and 18 (18 not shown) and tank valve 12 are attached to a cylindrical inflator housing 90. As will be recognized by those skilled in the art the shape and configuration of the inflator housing 10 or 90 may be modified in a variety of configurations to suit particular requirements. The shape and configuration of the inflator housing however is preferably arranged so that the relief valve 70 is disposed on the inflator housing in a convenient location for the operator to operate the spring loaded pressure relief button 92 by depressing it with a finger while observing the indicator needle 76 in pressure gauge 14.

Figure 6:
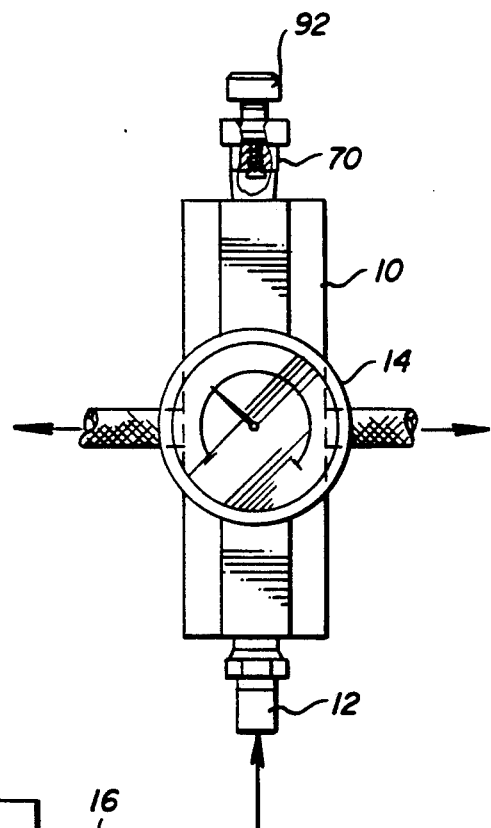
FIG. 6 is another alternative embodiment of the dual tire inflator illustrating an alternative arrangement of the tank valve, bleed valve, partly in section, pressure gauge and hose assembly.
Figure 7:
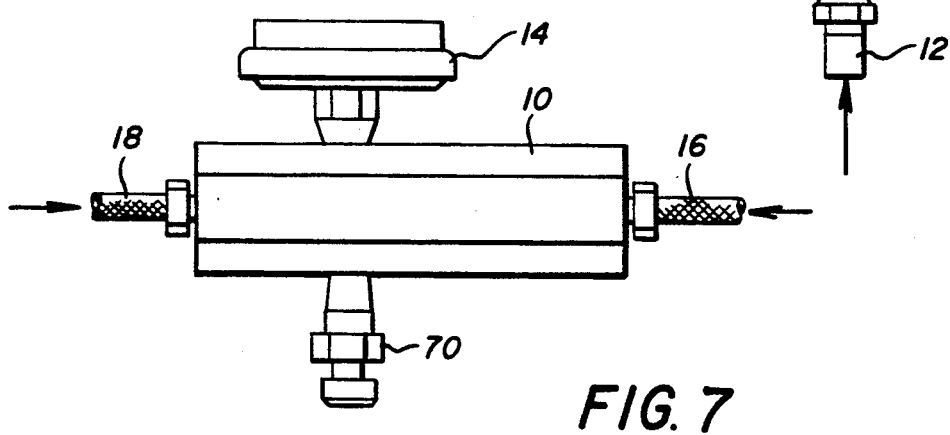
FIG. 7 is a further alternative embodiment for the arrangement of the pressure gauge, bleed valve, tank valve and hose assembly in accordance with the invention.

Referring now to FIGS. 6 and 7 further alternative arrangements for the combination of relief valve 70 pressure gauge 14 and hose assemblies 16 and 18 are illustrated. It will be recognized by those skilled in the art that these and various other arrangements and configurations for the housing 10 may be utilized in accordance with the invention. In addition the arrangement of the relief valve 70, hose assemblies 16 and 18 together with the tank valve 12 may be utilized and arranged in various configurations to provide a detachable and transportable dual tire inflator which does not interfere with the normal operation and configuration of dual tire arrangements commonly employed in vehicles and aircraft.

The invention may be implemented in a variety of ways utilizing a variety of configurations for the inflator housing and components to implement the advantages of the invention in providing a fully detachable dual tire inflator for equalizing tire pressure in dual tire arrangements. In addition the configurations for the dual tire inflator may be assembled using various equivalent parts to provide a safe, durable and economically constructed dual tire inflator. It will be appreciated numerous modifications and alternative arrangements made by those skilled in the art which are within the spirit and scope of the invention as defined in the following claims.

What is claimed is:

1. A dual time pneumatic inflator comprising:
   (a) a housing having an inlet opening, a pressure gauge opening, a relief valve opening and at least two hose assembly openings in direct communication with one another in said housing;
   (b) an inlet valve disposed in said inlet opening of said housing said inlet valve opening communicating at one end directly with said pressure gauge opening, said relief valve opening and said at least two hose assembly openings and detachably communicating at the other end with a single pressure source;
   (c) a pressure gauge disposed in said pressure gauge opening;
   (d) a pressure relief valve disposed in said relief valve opening;
   (e) a first hose assembly disposed in one of said at least two hose assembly openings;
   (f) a first locking tire chuck valve disposed on said first hose assembly;
   (g) a second hose assembly disposed in the other of said at least two hose assembly openings; and
   (h) a second locking tire chuck valve disposed on said second hose assembly.

2. The duel tire pneumatic inflator of claim 1 wherein said pressure relief valve is spring loaded.

3. The dual tire pneumatic inflator of claim 1 wherein said first locking tire chuck valve of said first hose assembly includes a spring locking mechanism.

4. The duel tire pneumatic inflator of claim 3 wherein said second locking tire chuck valve of said second hose assembly includes a spring locking mechanism.

5. The duel tire pneumatic inflator of claim 4 wherein said first hose assembly and said second hose assembly and said relief valve opening are disposed at an angle of about 120 degrees to each other.

6. The duel tire pneumatic inflator of claim 1 wherein said inlet opening is disposed in a side opposite to said pressure gauge opening.

7. A pneumatic tire inflator comprising:
(a) a first locking tire chuck valve for locking said first locking tire chuck valve directly to the valve stem of a tire;
(b) a second locking tire chuck valve for locking said second locking tire chuck valve directly to the valve stem of a tire;
(c) a first hose attached to said first locking tire chuck valve;
(d) a second hose attached to said second locking tire chuck valve;
(e) a pressure gauge for indicating pressure;
(f) a pressure relief valve for releasing pressure in said hose;
(g) a housing having a pressure relief valve opening, pressure gauge opening and inlet opening and an outlet opening in direct communication with said first hose and said second hose and in further direct communication with said pressure relief valve and said pressure gauge; and
(h) an inlet valve disposed in said inlet opening directly communicating at one end with said outlet opening in said housing and detachably communicating at the other end with a single pressure source.

8. The pneumatic tire inflator of claim 7 wherein said pressure relief valve is spring loaded.

9. The pneumatic tire inflator of claim 8 wherein said spring loaded pressure relief valve includes a finger actuated button for releasing pressure in said hose.

10. The pneumatic tire inflator of claim 9 wherein said pressure gauge is disposed on one side of said housing.

11. The pneumatic tire inflator of claim 10 wherein said inlet valve is disposed on a side opposite to said pressure gauge.

12. The pneumatic tire inflator of claim 11 wherein said first locking tire chuck valve includes a lever for locking and unlocking said locking tire chuck valve.

13. The pneumatic tire inflation of claim 12 wherein said second locking tire chuck valve includes a lever for locking and unlocking said tire chuck valve.

14. The pneumatic tire inflator of claim 11 wherein said pressure gauge includes pressure indications to 200 psi.

15. A dual tire inflator comprising:
(a) a housing having an inlet opening, a pressure gauge opening, a relief valve opening and an outlet opening said outlet opening in direct communication with said inlet opening, said pressure gauge opening and said relief valve opening;
(b) an inlet valve disposed in said inlet opening of said housing and directly communicating at one end with said pressure gauge opening, said relief valve opening and said outlet opening and detachably communicating at the other end with a single pressure source;
(c) a pressure gauge disposed in said pressure gauge opening;
(d) a pressure relief valve disposed in said relief valve opening;
(e) a first locking tire chuck valve;
(f) a second locking tire chuck valve;
(g) a first hose for connecting said first locking tire chuck valve to said outlet opening in said housing; and
(h) a second hose for connecting said second locking tire chuck valve to said outlet opening in said housing.

16. The duel tire inflator of claim 15 further comprising a second outlet opening in said housing and a second hose for connecting said second locking tire chuck valve to said second outlet opening in said housing.

17. The dual tire inflator of claim 16 wherein said pressure relief valve includes a button for releasing pressure in said first hose and said second hose.

18. The dual tire inflator of claim 17 wherein said housing is of an elongated hexagonal configuration.

19. The duel tire inflator of claim 17 wherein said inlet opening is disposed in a side opposite to said pressure gauge.

20. The duel tire inflator of claim 19 wherein said first outlet opening and second outlet opening and said pressure relief valve are disposed at an angle of about 120 degrees to each other.

* * * * *